Nov. 26, 1940. W. OWEN 2,223,123
APPARATUS FOR BENDING GLASS SHEETS
Filed April 8, 1938 2 Sheets-Sheet 1

INVENTOR
WILLIAM OWEN
BY Bradley & Rue
ATTORNEYS.

Nov. 26, 1940. W. OWEN 2,223,123
APPARATUS FOR BENDING GLASS SHEETS
Filed April 8, 1938 2 Sheets-Sheet 2
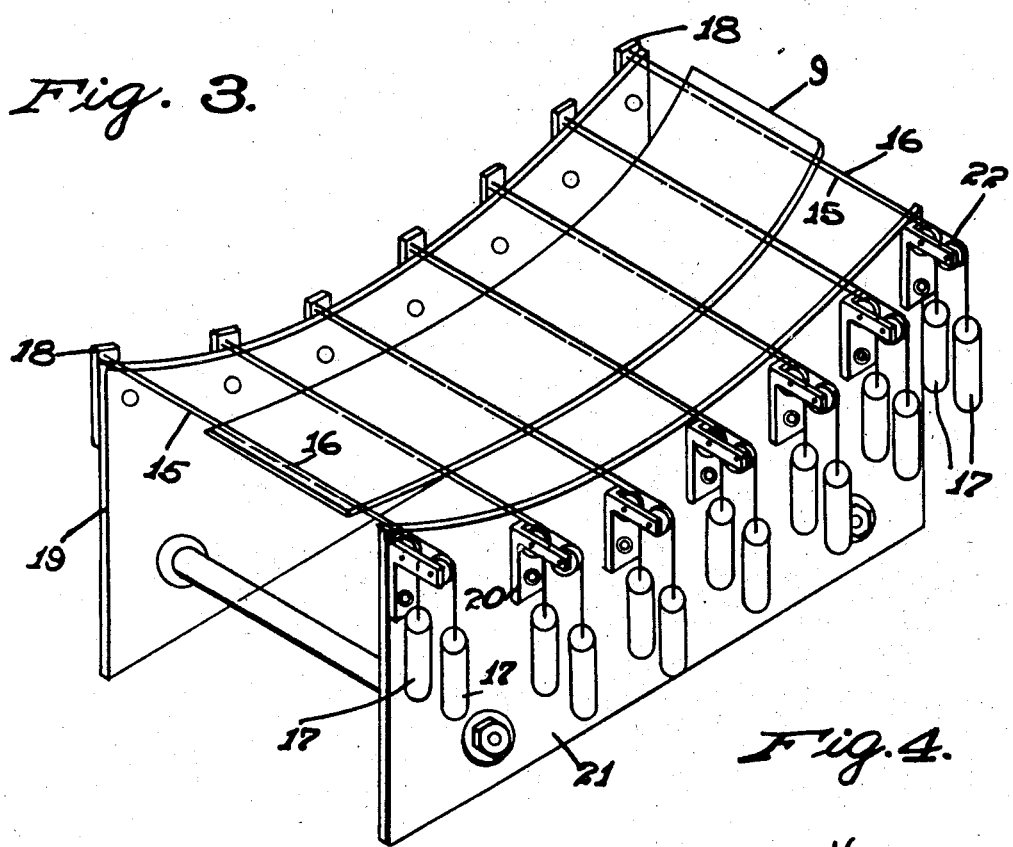
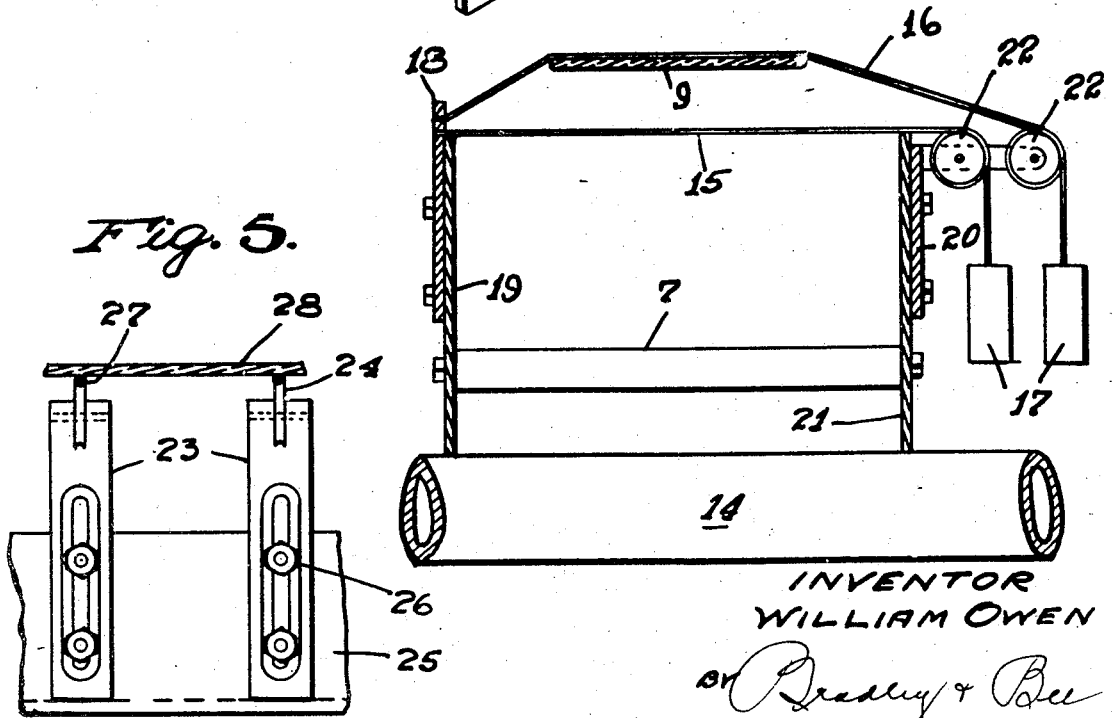
INVENTOR
WILLIAM OWEN
BY Bradley & Bell
ATTORNEYS.

Patented Nov. 26, 1940

2,223,123

UNITED STATES PATENT OFFICE 2,223,123

APPARATUS FOR BENDING GLASS SHEETS

William Owen, Pittsburgh, Pa., assignor to Pittsburgh Plate Glass Company, Allegheny County, Pa., a corporation of Pennsylvania Application April 8, 1938, Serial No. 200,917

4 Claims. (Cl. 49—67)

Figure 1:
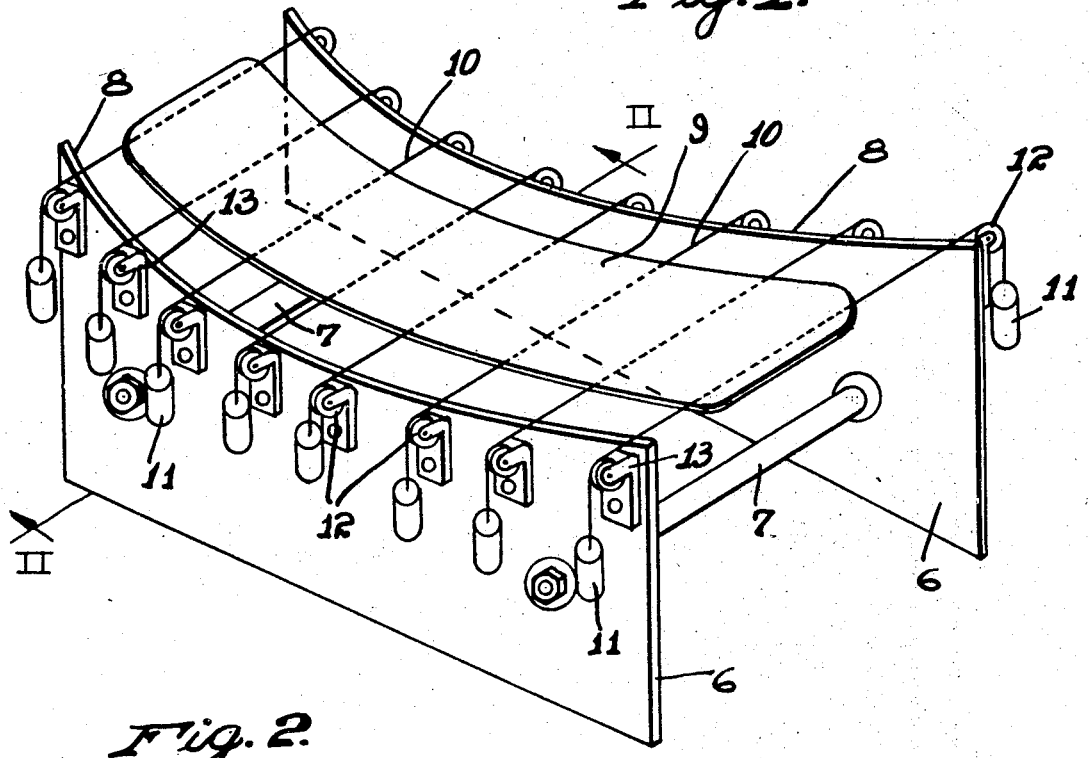
Figure 2:
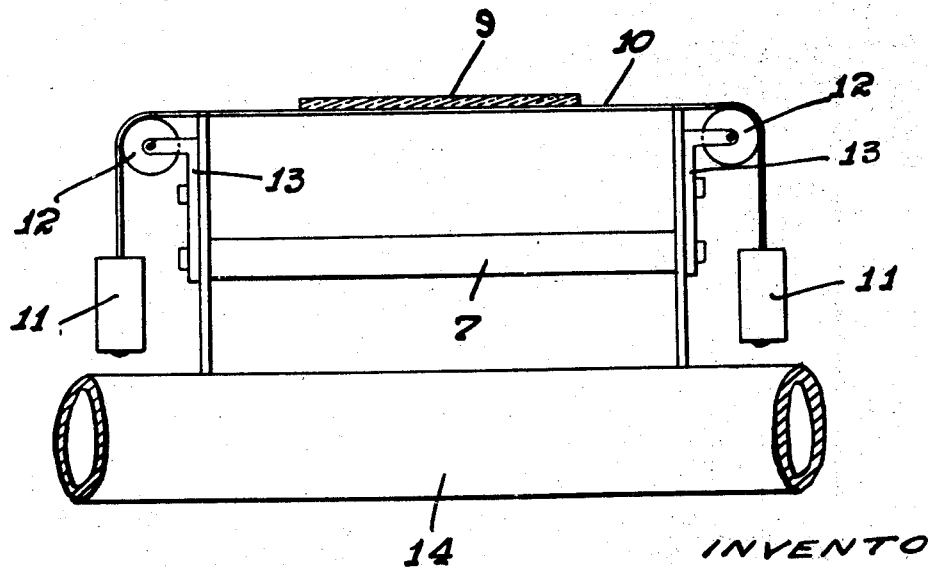

The invention relates to apparatus for bending glass sheets and constitutes an improvement over the apparatus of the patents to R. A. Miller No. 2,003,383, dated June 4, 1935, and H. J. Galey No. 2,021,180, dated November 19, 1935. The principal object of the invention is the provision of an improved apparatus in which any tendency to mar the glass where it contacts with the form is avoided, and in which the area of contact between the bending or forming means and the glass is reduced to a minimum. A further object is to provide positive means for bending the glass, so that such bending may be accomplished at lower temperatures than is the case when gravity alone is relied upon to secure the bending movement. It is advantageous to operate at lower temperatures, since the tendency to mar the glass is reduced. As in the Miller process, the glass sheet to be bent is supported in horizontal position on the form, and carried horizontally through a tunnel kiln or leer, the glass being brought up to a temperature at which it will bend without marring, after which it is carried through an atmosphere of decreasing temperatures to harden and anneal the glass or to case harden it by the application of chilling blasts of air. The apparatus is illustrated as applied to the bending of single sheets of glass, but is also applicable to the bending of glass sheets in pairs for making safety glass, no change in the construction being required in so using the apparatus. Certain embodiments of the invention are illustrated in the accompanying drawings, wherein:

Figure 1 is an isometric view of one form of apparatus. Fig. 2 is a transverse section on the line II—II of Fig. 1 and to which a portion of a roller of a leer has been added. Fig. 3 is an isometric view of a modification. Fig. 4 is a transverse section through the Fig. 3 construction, but showing the glass before bending and to which a portion of a roller of a leer has been added. And Fig. 5 is a partial side elevation showing a further modification.

Referring to the drawings, 6, 6 are a pair of parallel side plates tied together by the transverse members 7, 7 and constituting the frame of the device. The upper edges 8, 8 of the plates 6, 6 are formed to the curvature to which the glass sheet 9 is to be bent. A grid for supporting the sheet is provided in the form of the series of wires 10, 10, etc. which extend transversely of the plates 6, 6, resting upon the curved edges thereof and carrying at their ends thereof the weights 11. The wires pass over pulleys 12 at each side of the frame, such pulleys being carried upon brackets 13 bolted to the plate 6, 6. The heating oven or leer through which the device is passed is preferably of the roller type, one of the rolls 14 being shown in Fig. 2.

In using the device, the flat sheet to be bent is placed upon the grid, its ends at such time contacting only with the two wires at the extreme ends of the frame. The assembly is passed along the heating kiln until the sheet arrives at a temperature sufficient to cause it to bend by gravity, so that it contacts with all of the wires, as indicated in Fig. 1. A further travel of the form then carries it through a cooler section of the kiln where the glass sets and is annealed in a manner well known in the art.

In the modification of Figs. 3 and 4, positive means are provided for pressing the glass sheet downward, so that it engages the lower set of wires 15, which correspond in function to the wires 10 of the first construction. Such pressing down means comprises a series of wires 16 in parallel with the wires 15 and directly thereabove. This construction also departs from that of Figs. 1 and 2 in that only one end of the wires are provided with the weights 17, the other ends being fixed to the brackets 18 on the side plate 19. The brackets 20 on the side plate 21 are each provided with a pair of pulleys 22, over which the ends of the wires 15 and 16 pass. The operation in bending the glass sheet 9 is the same as heretofore described, except that the movement of the sheet to bending position is assisted by the wires 16, so that the bending will occur at a lower temperature than in the first type of construction, in which gravity alone is relied upon to secure the bending movement of the sheet. This lower temperature is advantageous as under these conditions, there is less tendency of the wires to mar the surface of the sheet.

Fig. 5 indicates a modification, wherein the brackets 23, which carry the pulleys 24 extend above the edges of the side plates 25. The brackets are slotted and clamped by means of the bolts 26 so that a vertical adjustment is possible. The construction is, in other respects, similar to that of Figs. 1 and 2, transverse wires 27 passing over the pulleys and constituting the grid upon which the glass sheet 28 is bent. This type of construction presents an advantage over those heretofore described, in that plates of different curvatures may be bent by adjusting the brackets 23 vertically, so that the series of wires 27 lies at the proper elevation to give the desired curvature.

What I claim is:

1. In an apparatus for bending a glass sheet, a pair of spaced parallel frame members, a grid carried by the members and comprising a series of horizontal wires lying transversely of the frame members, means holding the wires on the frame members at various elevations in horizontal spaced relation including means connected to the wires adjacent one frame member and resisting movement of the wires toward the other frame member, and weights connected to the wires adjacent said other frame member for tensioning the latter between the frame members, the grid formed by the tensioned wires defining a predetermined zone of curvature to which the glass sheet may be bent.

2. In an apparatus for bending a glass sheet, a pair of spaced parallel frame members, a metallic grid carried by the members, mechanism for pressing the sheet down against the grid when the sheet is heated to softening temperature and including a series of horizontal wires arranged above the grid transversely of the frame members, means vertically adjustable on the frame members holding the wires at various elevations in horizontal spaced relation including means connected to the wires adjacent one frame member and resisting movement of the wires toward the other frame member, and weights connected to the wires adjacent said other frame member for tensioning the latter wires between the frame members, the grid formed by the tensioned wires defining a predetermined zone of curvature to which the glass may be bent.

3. In an apparatus for bending a glass sheet, a pair of spaced parallel frame members, a series of horizontal base wires lying transversely of the frame members, and supported thereby, said wires lying at various elevations, a series of pressing wires arranged above the base wires transversely of the frame members for forcing the glass sheet down against the base wires when the sheet is heated to softening temperature, means holding the pressing wires on the frame members at various elevations in horizontal spaced relation including means connected to said pressing wires adjacent one frame member and resisting movement of the wires toward the other frame member, and weights connected to said pressing wires adjacent said other frame member for tensioning the latter between the frame members, the grid formed by the tensioned wires defining a predetermined zone of curvature to which the glass sheet may be bent.

4. In an apparatus for bending a glass sheet, a frame member comprising a pair of parallel frame members having similarly curved upper edges, a series of horizontal wires lying over the frame members transversely thereof, means holding the wires on the frame members at various elevations in horizontal spaced relation including means connected to the wires adjacent one frame member and resisting movement of the wires toward the other frame member, and weights connected to the wires adjacent said other frame member for tensioning the latter between the frame members, the grid formed by the tensioned wires lying over said curved upper edges defining a predetermined zone of curvature to which the glass sheet may be bent.

WILLIAM OWEN.